(12) United States Patent
Tollasepp et al.

(10) Patent No.: US 9,414,717 B2
(45) Date of Patent: Aug. 16, 2016

(54) SINK CONTAINER ASSEMBLY

(71) Applicant: Tonis Tollasepp, Toronto (CA)

(72) Inventors: Tonis Tollasepp, Toronto (CA); Jason Nip, Toronto (CA)

(73) Assignee: Tonis Tollasepp, Toronto, ON (CA)

( * ) Notice: Subject to any disclaimer, the term of this patent is extended or adjusted under 35 U.S.C. 154(b) by 500 days.

(21) Appl. No.: 13/907,312

(22) Filed: May 31, 2013

(65) Prior Publication Data
US 2014/0352054 A1    Dec. 4, 2014

(51) Int. Cl.
*A47J 47/20*    (2006.01)
*F16B 47/00*    (2006.01)

(52) U.S. Cl.
CPC . *A47J 47/20* (2013.01); *F16B 47/00* (2013.01)

(58) Field of Classification Search
CPC ........................................ A47J 47/20
USPC ..................... 4/654, 657, 658, 290
See application file for complete search history.

(56) References Cited

U.S. PATENT DOCUMENTS

| | | | |
|---|---|---|---|
| 1,892,481 A * | 12/1932 | Carlson ................... | A47J 47/20 4/290 |
| 2,002,113 A * | 5/1935 | Hunt ....................... | A47J 47/20 4/290 |
| 2,044,520 A | 6/1936 | Weiant | |
| 4,531,246 A | 7/1985 | Earley | |
| 5,176,347 A | 1/1993 | Rouail | |
| 5,590,804 A | 1/1997 | Crum et al. | |
| 6,152,294 A | 11/2000 | Weinberg | |
| 6,330,948 B1 | 12/2001 | Leto | |
| 6,402,104 B1 | 6/2002 | Smith | |
| D483,587 S | 12/2003 | Snell | |
| 6,991,200 B2 | 1/2006 | Stillman | |
| D532,235 S | 11/2006 | Snell | |
| D532,639 S | 11/2006 | Snell | |
| D566,919 S | 4/2008 | Snell | |
| D635,383 S | 4/2011 | Yang et al. | |
| 8,296,876 B2 | 10/2012 | Yang et al. | |

FOREIGN PATENT DOCUMENTS

| | | |
|---|---|---|
| GB | 2444635 | 11/2008 |
| JP | 11221165 | 8/1999 |
| JP | 2001214490 | 8/2001 |
| JP | 2005089179 | 4/2005 |
| JP | 2011001164 | 1/2011 |
| JP | 2011041700 | 3/2011 |
| JP | 2012101137 | 5/2012 |

\* cited by examiner

*Primary Examiner* — Tuan N Nguyen
(74) *Attorney, Agent, or Firm* — Simpson & Simpson, PLLC

(57) ABSTRACT

A sink container assembly comprising a container, having a top end, a bottom end, a front, and a rear; a hanger protruding outwardly from the container proximate the top end and the rear, a foot protruding downwardly from the container proximate the bottom end; and, a receiving member arranged to removably receive the hanger and having an attachment means arranged to maintain the container in a sink in a substantially vertical position.

21 Claims, 10 Drawing Sheets

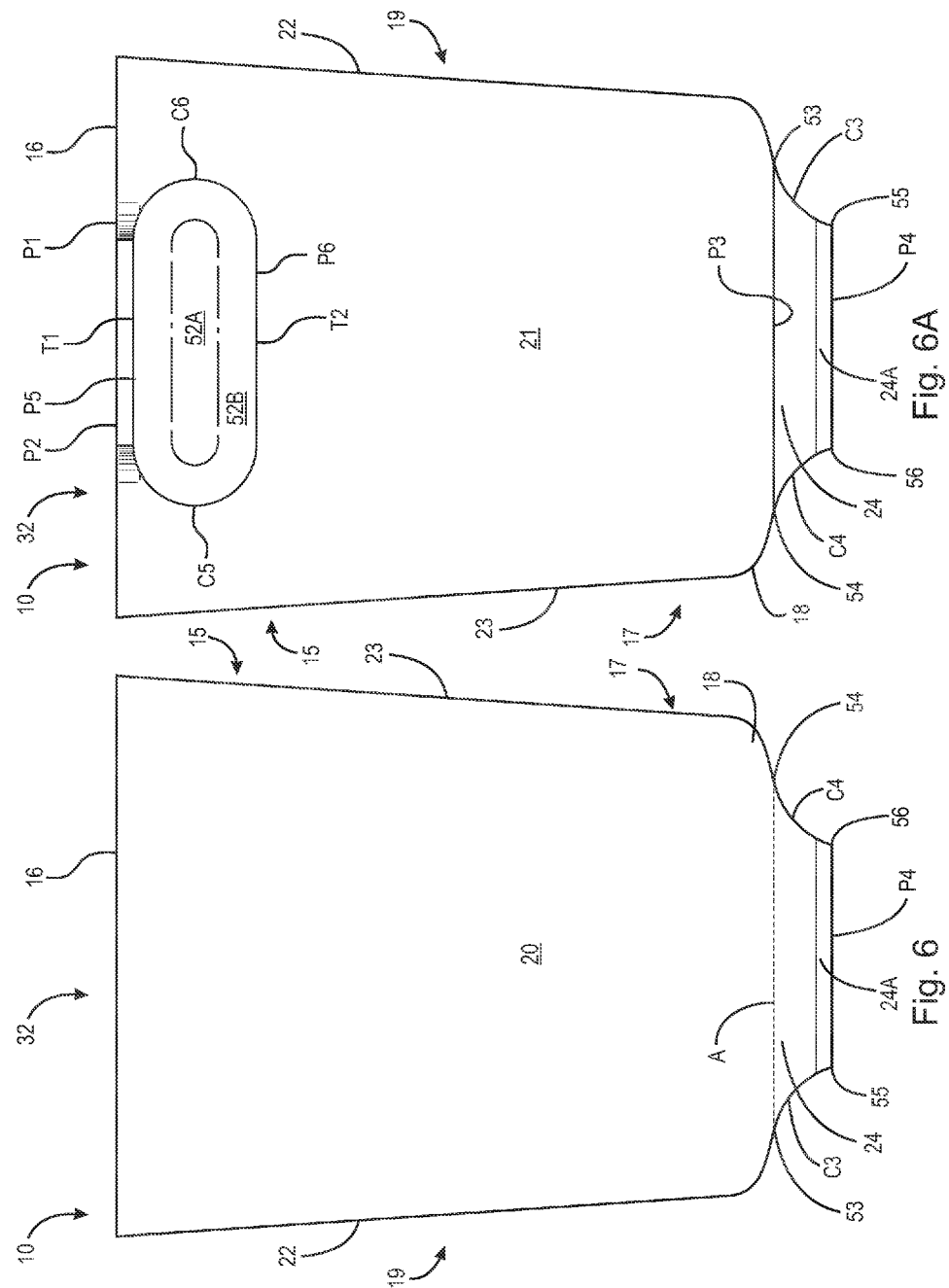

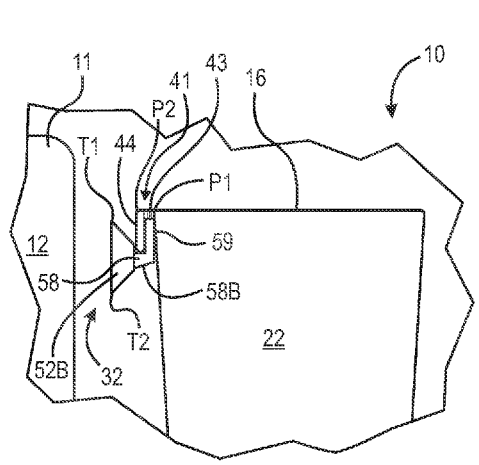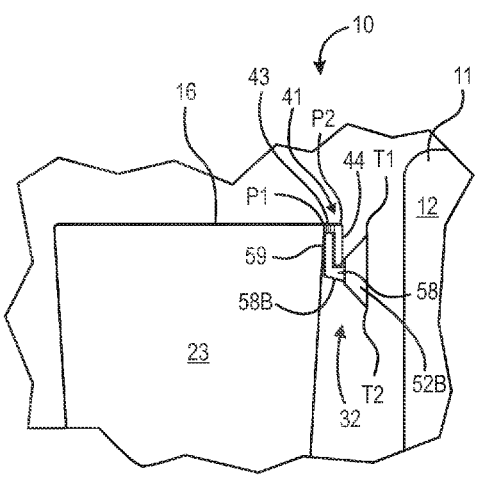
Fig. 7    Fig. 7A
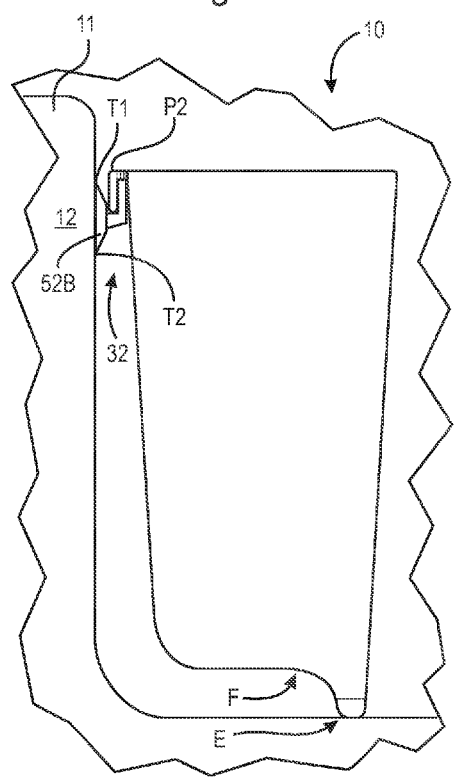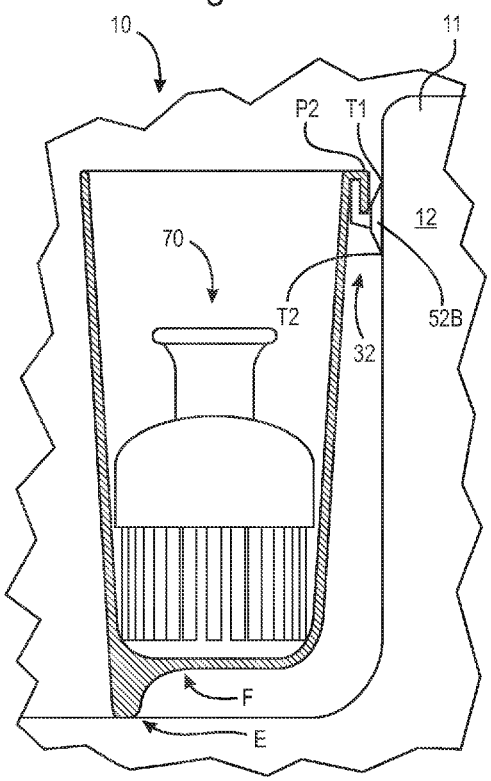
Fig. 8    Fig. 8A

SINK CONTAINER ASSEMBLY

FIELD OF THE INVENTION

The invention relates generally to kitchen and bathroom accessories and more specifically, to sink containers.

BACKGROUND OF THE INVENTION

Sinks are found in many places: homes, offices, restaurants, hotels, industrial plants, museums, airplanes, theaters, and malls to name a few. Sinks are even found in some larger boats and portable bathrooms. Sinks are commonly used for cooking and cleaning for example, sinks are typically used to assist with backbreaking and time consuming domestic duties such as dish washing and laundry. Additionally, sinks can add a sleek and/or a distinctive and trendy design feature to a room. Such designs are achieved because sinks can be constructed from a variety of materials, according to various styles, shapes and sizes. For example, there are stand-alone sinks which have no counter tops, self-rimming or drop-in sinks which are lowered into a counter top, undermount sinks which have no raised sink edges above the counter top, London sinks which are shallow rectangular ceramic sinks with a rounded rim set into a work surface, farmer's sinks which are deep and have a finished front, and vessel sinks which are free-standing sinks generally finished and decorated on all sides which sit direction on the surface of the furniture on which it is mounted. Sinks are commonly made of non-porous materials including plastic, ceramic, soapstone, concrete, wood, copper, stainless steel, injection-molded thermoplastics, glass and stone.

The mouth of a sink as well as the depth and radius of a sink can be further stylized. Sink mouths are commonly square, rectangular, circular, or oval, but sink mouths can also be non-regular polygonal shapes and/or have rounded edges and curves for example, D-shaped sinks A sink having a circular cross section could be conical, spherical, and/or spheroidal. Sinks can be configured in an infinite number of ways.

Usually not far from a sink there are sink implements such as scrubbing brushes, soaps, sponges, toothbrushes, razors, toothpastes and hand and/or facial cleansers. These items can be used so frequently that they are ordinarily stored within an arms distance of the sink. These implements can be stored away from the sink, for example, in cupboards, but often, these implements are left out in the open around a sink. When these items are left out in the open they are typically found on the edge of the sink, behind the faucet, on the countertop, or in other areas surrounding the sink for quick and easy access. When in use or not, these kitchen and bathroom implements are splashed with water from the sink faucet and must be left out to dry; this cycle clutters the area around the sink. The area around a sink can be valuable space which, but for the sink implements, could be used for food preparation or, for the simplistic, could be used for nothing at all and be free of clutter.

In addition to cluttering, sink implements stored in the open air around a sink on a countertop raise sanitary concerns. For example, after washing dishes with a sponge, the sponge is wet and dirty from wiping away food particles. When the sponge is left on the counter to dry, the sponge can transfer bacteria and mildew to the countertop. Additionally, after use, sink implements stored in the open air around the sink can leave unsightly water puddles and stains. Sink containers can organize and store sink implements.

Sink containers can also be used to assist with dish washing. Typically, a user fills a sink with soapy water and repeatedly uses the soapy water to rinse glasses, silverware, pots and pans; the soapy water quickly becomes soiled. Objects left near the sink filled with soapy soiled water can quickly become soiled too. Moreover, filling an entire sink with soapy water for dish washing can be wasteful. Even more problematic is the scenario where a sink is filled with soapy water and there is a bar of soap, dishes, forks, knives, and/or broken glass, for example, also in the sink. A user can waste valuable time searching for the items in the sink because the user cannot see through the soapy water. Or, dangerous items in the sink can injure a user because the user cannot see them submerged in the soapy water. For these reasons, others have attempted to create sink accessories that aid in dish washing, food preparation, organizing, storing, and sanitizing kitchen and bathroom implements.

Typically, sink accessories include dishes, containers, or racks and often employ suction cups as a means for attaching it to, and/or suspending it from, a sink. One such dish type sink accessory is described in U.S. Pat. No. 6,152,294 (Weinberg), which discloses a dish having a rectangular prism shape made of wire. The dish can be arranged on a countertop or suspended from walls connected at a right angle by suction cups, which are arranged on two adjacent sides of the wire dish. Unfortunately, when the dish is placed on the countertop, the dish takes up valuable space. When the dish is suspended, the dish tends to slide vertically along the walls and spontaneously detach from the walls.

A container type sink accessory is described in U.S. Pat. No. 8,296,876 (Yang et al.) which discloses a sink organizer having a container, suction cups protruding from a planar side of the container and a bracket protruding upwardly from the planar side of the container with the suction cups. The bracket features a handle, which is configured to rest against the top edge of the sink to provide additional vertical stability for the sink organizer. Unfortunately, the described sink organizer can be used only on primarily flat surfaces because the side of the container with suction cups is planar. Additionally, the handle that rests against the top edge of the sink takes up valuable countertop space and can be unsightly. Furthermore, a user carrying on tasks above and around the sink can inadvertently push around the handle; the container could become detached from the sink. Furthermore, the container described, when attached, does not sit flush with the wall because the suction cups protrude from the container. The container described here tends to slide along the wall horizontally.

A rack type sink accessory is described in U.S. Pat. No. 6,330,948 (Leto). The rack disclosed includes a frame having a cradle on one side for holding a scrubber, and on the other side, one or more arms to hook over the flange of a sink to suspend the rack on the sink wall. The rack is attached to a sink with a suction cup. Although the arms that hook over the flange of the sink provide additional vertical stability for the rack, the arms take up valuable countertop space and can be unsightly. Like the container type sink accessory described above, a user can inadvertently push around the arms of the rack type sink accessory and the rack could disengage with the sink. Additionally, in order to clean the rack a user must remove the suction cups with the rack.

Therefore, there has been a long-felt need for a sink accessory for organizing and storing kitchen or bathroom implements that is aesthetically pleasing, stylish and functional in sinks of all shapes and sizes. A stylish sink accessory, which fits in corners and along all sides of a sink, is needed. A stylish sink accessory for left-handed and right-handed users is also needed. Additionally, there has been a long-felt need for a stylish sink accessory that eliminates the sanitary concerns related to leaving dirty implements on countertops. A stylish sink accessory, which has improved vertical and horizontal stability, is needed. Moreover, there is a need for a stylish sink accessory, which can be easily removed from the attachment means for cleaning or as a safety release. Additionally, there is a long-felt need for a sink accessory which is substantially flush with the wall of a sink when engaged. There has been a long-felt need for a sink accessory which, when attached to a sink in a stable manner, does not take up valuable countertop space. A stylish sink container is needed which can function as a colander or a receptacle for food waste.

BRIEF SUMMARY OF THE INVENTION

The present invention is a sink container assembly comprising a container, having a top end, a bottom end, a front, and a rear; a hanger protruding outwardly from the container proximate the top end and the rear, a foot protruding downwardly from the container proximate the bottom end and a receiving member arranged to removably receive the hanger and having an attachment means arranged to maintain the container in a sink in a substantially vertical position.

A general object of the invention is to provide a sink accessory for sinks of all shapes and sizes. This is achieved by altering the shape of the container and adding a foot protruding downwardly from the container such that the sink container can rest along the basin of any shaped sink.

Another object of the invention is to provide a sink accessory which attaches to the inside wall of a sink without involving the top surface of the sink or any countertop space around the sink and, when attached, the sink accessory achieves maximum vertical and horizontal stability.

Yet another object of the invention is to provide a sink accessory that eliminates the sanitary concerns related to leaving dirty implements on countertops and is easily removed for cleaning or for safety without necessitating the removal of the suction means.

Still a further object of the present invention is to provide a sink accessory having an attachment means which, when engaged with a sink wall, provides a substantially flush engagement between the top of the container and the sink wall.

A further object of the present invention is to provide a sink accessory that rests on the floor of a sink but also allows water and food to pass under the container. An additional object of the present invention is to provide a sink container that promotes water conservation. A user can use substantially less water while dish washing by filling up a sink container rather than the entire sink.

An additional object of the present invention is to provide a sink accessory that can function as a receptacle for food waste or a colander.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying figures, in which:

FIG. 3A is an exploded perspective view of the sink container and the attachment of the invention;

FIG. 3B is an exploded side view showing the sink container and the attachment of the invention;

FIG. 3C is an exploded front view showing the sink container and the attachment of the invention;

FIG. 6 is a front view of the sink container of the invention;

FIG. 6A is a rear view of the sink container of the invention;

FIG. 7 is a detailed left view of the sink container engaged with the receiving member of the invention proximate a sink;

FIG. 7A is a detailed right view of the sink container engaged with the receiving member of the invention proximate a sink;

FIG. 8 is a left view of the sink container engaged with the receiving member of the invention secured to a sink;

FIG. 8A is a partial cross section right view of the sink container shown in FIG. 3B engaged with the receiving member of the invention secured to a sink;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. In regards to the current invention, dimensions should be understood as follows: height refers to the vertical elevation of a structural element; length refers to the horizontal span of a structural element; and width refers to the depth of a structural element. It should be understood that continuous side wall 19 could be molded from a single piece of material or at least two pieces of material secured together. Although any methods, devices or materials similar or equivalent to those described herein can be used in the practice or testing of the invention, the preferred methods, devices, and materials are now described.

Figure 1:
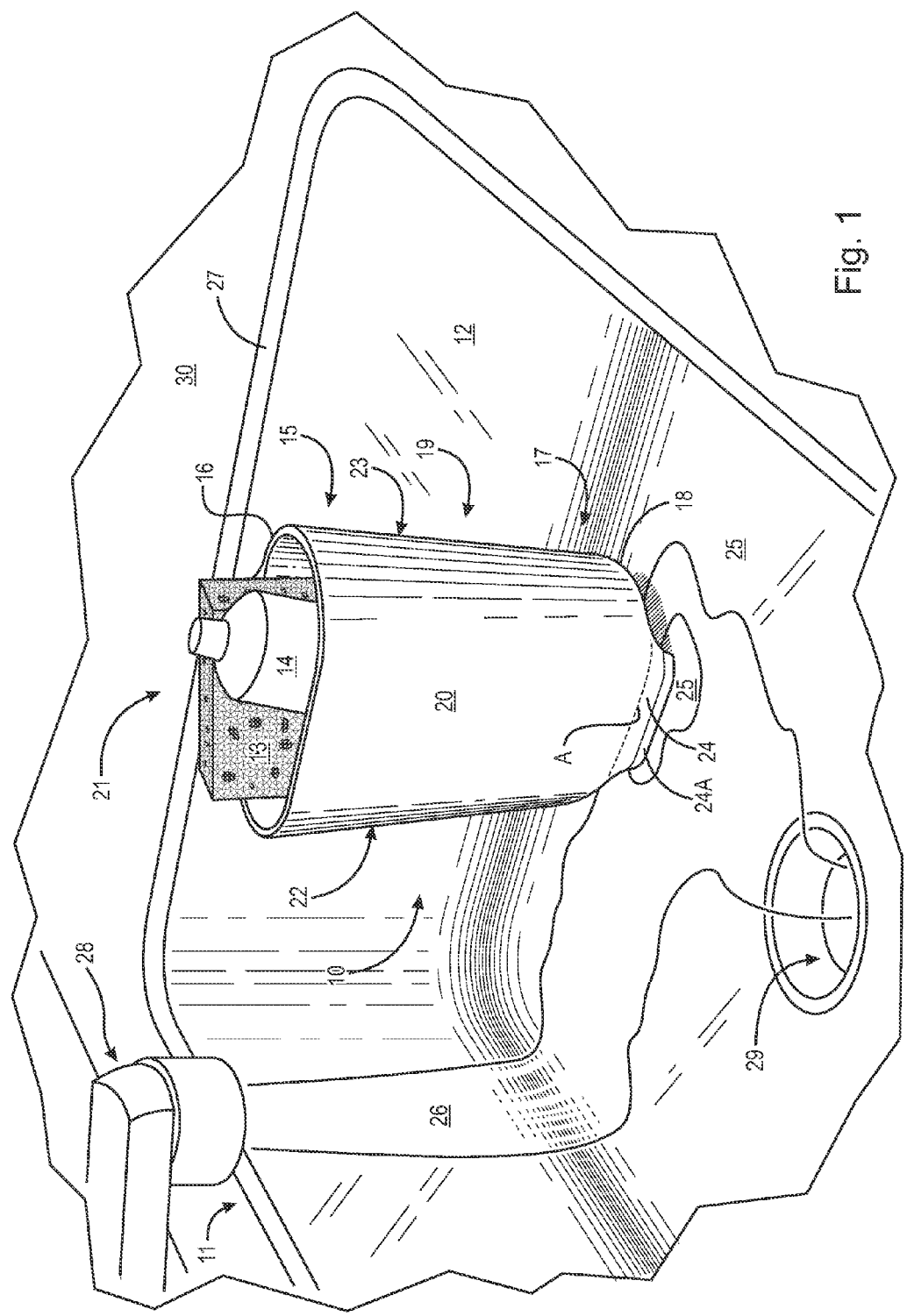
FIG. 1 is a perspective view of the sink container of the invention shown secured to a sink.

Adverting now to the Figures, FIG. 1 is a perspective view of sink container 10 attached to sink 11 specifically, on inner wall 12 of sink 11. Sink container 10 is shown storing sponge 13 and toothpaste tube 14 within the confines of sink 11. It should be appreciated that sink container 10 could store anything, for example, a brush or dish-washing water. Sink container 10 comprises front 20, rear 21, top 15, bottom 17, left side 22, and right side 23. Front 20, rear 21, right and left sides 22 and 23, respectively, form continuous side wall 19. Sink container 10 is generally in the shape of a three dimensional parabola or an open-ended and hollow ellipsoid which is truncated at the top. Top 15 is defined by perimeter 16, which is shaped as an elongated circle having a pair of parallel sides proximate front 20 and rear 21, respectively. Bottom 17 is similarly defined by perimeter 18. Preferably, perimeter 16 is larger than perimeter 18 and, in turn, top 15 is larger than bottom 17. However, it should be appreciated that bottom 17 could be equivalent or larger than top 15. Continuous side wall 19 connects perimeter 16 to perimeter 18. Continuous side wall 19 is substantially straight and smooth and preferably, opaque. Continuous side wall 19 could be any shape connecting perimeter 16 and perimeter 18 and could contain grooves, ridges, or curves, for example. Right and left sides 22, 23 are arcuate longitudinally.

Sink container 10 further comprises foot 24 arranged to protrude downwardly along edge A of sink container 10. Edge A is located along perimeter 18 proximate front 20 and bottom 17. When sink container 10 is attached to sink 11, foot 24 is in contact with bottom surface 25 of sink 11. Foot 24 further comprises rubber 24A, which provides slip resistance against bottom surface 25. Rubber 24A could be any suitable slip resistance material (e.g., rubber or silicone) and could be applied with tape or tread. Alternatively, rubber 24A could be incorporated into the molding process of sink container 10. Preferably, rubber 24A is made of a thermoplastic elastomer (TPE) and incorporated in the molding process. As shown in FIG. 1, the underside of bottom 17 is elevated above and not in contact with bottom surface 25 of sink 11. This arrangement enables free flowing water 26, pouring from faucet 28, or any other materials, such as discarded food particles or ecologically safe cleaning products, to pass underneath sink container 10, around foot 24 and down drainage hole 29. Sink 11 can still be effectively rinsed while sink container 10 is attached.

It should be appreciated that no part of sink container 10 is in contact with countertop 30. A user can maintain a clutter free countertop while storing kitchen or bathroom implements such as toothpaste tubes, sink brushes, sponges, pens, etc. inside the sink, collecting food scraps, straining freshly washed blueberries, or merely holding dish-washing water. A user can use countertop 30 as extra space to prepare food or lay a chopping board or a dish-drying rack, for example.

Figure 2:
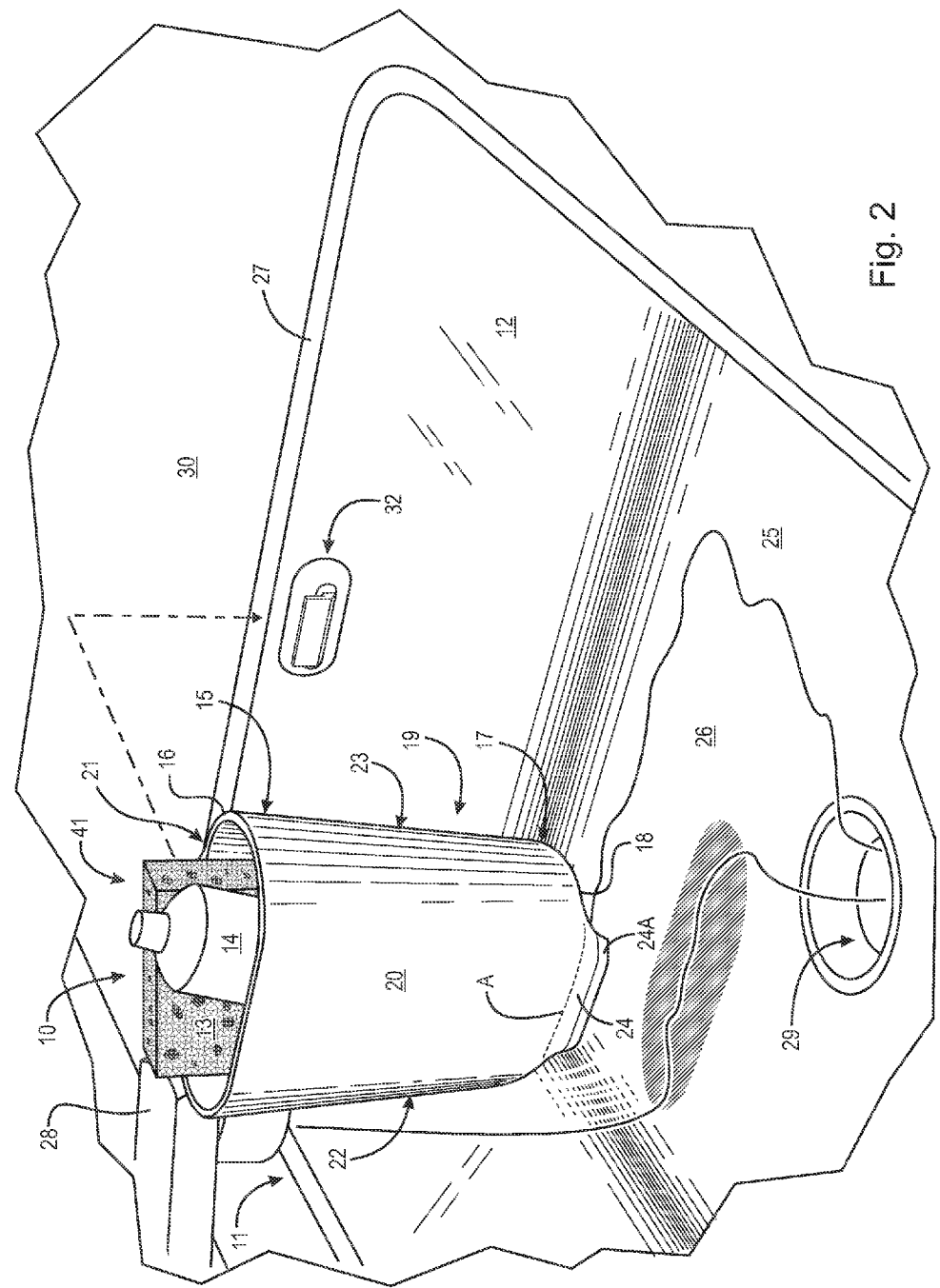
FIG. 2 is a perspective view of the sink container of the invention elevated away from the receiving member of the invention secured to a sink.

FIG. 2 shows sink container 10 suspended above bottom surface 25 of sink 11 away from inner wall 12 of sink 11. Free flowing water 26 is unhindered by foot 24. Receiving member 32 of sink container 10 is attached to inner wall 12 of sink 11. Receiving member 32 is not visible in FIG. 1 because it is hidden behind rear 21 of sink container 10, which is preferably opaque. However, it should be appreciated that sink container 10 could be transparent and in such a case, receiving member 32 would be visible through rear 21 in FIG. 1. Receiving member 32 is arranged below top surface 27 of sink 11. The direction arrow shown illustrates how a user would engage sink container 10 with receiving member 32. As will be explained in further detail, receiving member 32 is correspondingly shaped to receive hanger 41 (not visible) protruding from sink container 10 proximate rear 21 and top 15.

Figure 3:
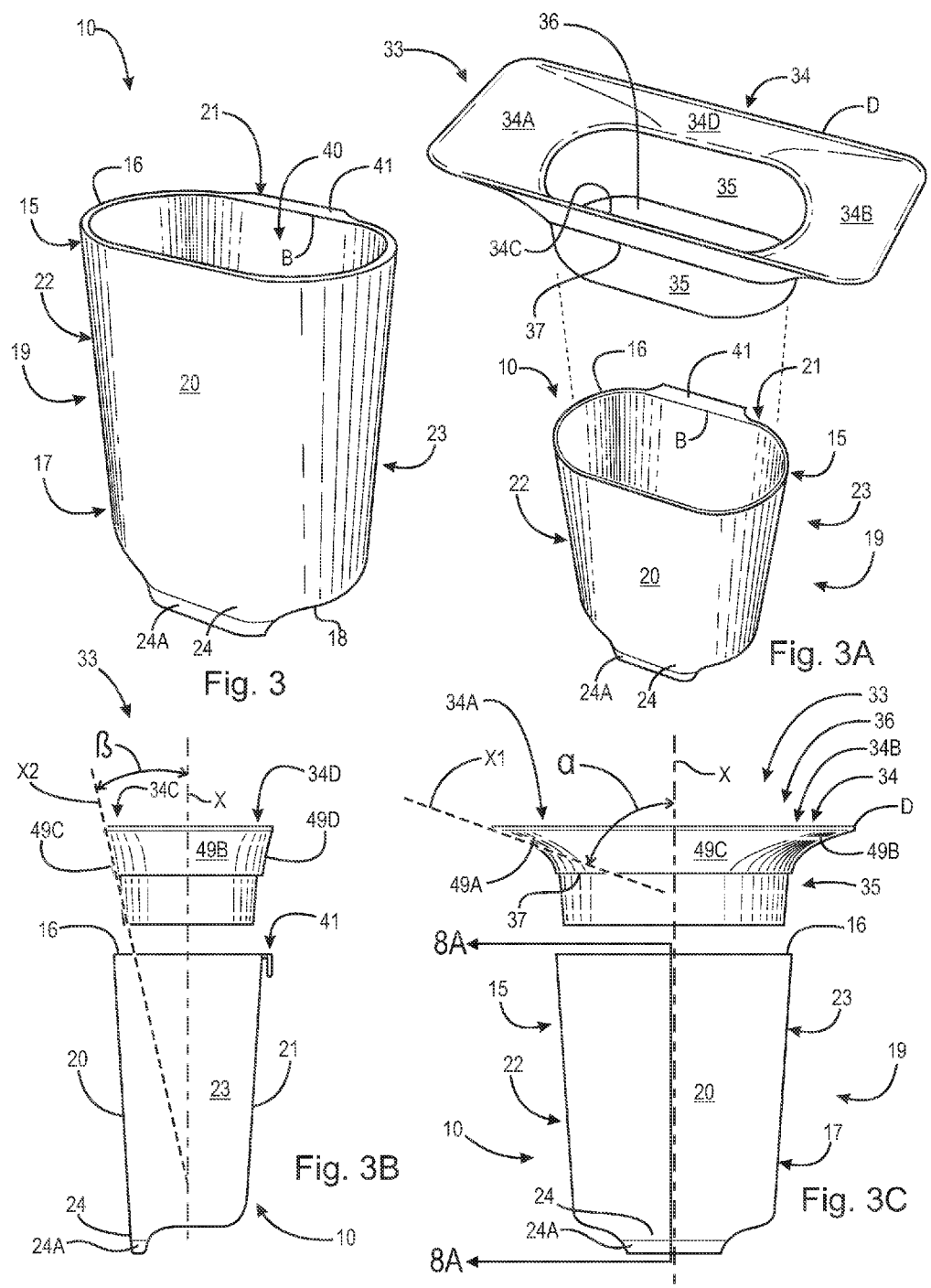
FIG. 3 is a front perspective view of the sink container of the invention.

Sink container 10 further comprises cavity 40 and hanger 41 as shown in FIG. 3. Cavity 40 is arranged to house implements such as sponge 13 and toothpaste tube 14 shown in FIGS. 1 and 2, dish-washing water, or to receive food waste. FIG. 3 shows sink container 10 separate from sink 11 and without sponge 13 or toothpaste tube 14. Cavity 40 has no partition walls preferably, but, it should be appreciated that partition walls could be added. Hanger 41 protrudes outwardly along edge B located along perimeter 16 proximate rear 21.

Preferably, sink container 10 also comprises attachment 33 as shown in FIGS. 3A, 3B, 3C, and 4C. Attachment 33 is applied to sink container 10 proximate top 15 and provides for catching and directing material, solid or liquid, into sink container 10. In FIGS. 3A through 3C, sink container 10 is shown arranged to receive attachment 33. Attachment 33 is used, for example, after a user chops onions, mushrooms, or peppers or washes blueberries, the user can pour the chopped or washed food into sink container 10 for safe keeping. Alternatively, attachment 33 could be used to catch and direct food scraps to be disposed of and/or recycled. Attachment 33 can help ensure that, when a user pours chopped or washed food into sink container 10, the user does not inadvertently miss sink container 10 and pour the chopped or washed food down the drain. In the alternative, attachment 33 can help ensure that, when a user prepares food and collects food waste, such waste can be neatly stored in sink container 10 to be discarded later. A user washing dishes can conserve dish washing water by storing soapy water in cavity 40 of sink container 10 rather than filling up an entire sink with soapy water for dish washing.

Attachment 33 shown in FIG. 3A comprises perimeter D and shelf 34 secured atop frame 35. Attachment 33 further comprises at least one opening 36 or through-bore to allow the passage of material into sink container 10. In the preferred embodiment shown, attachment 33 has a single opening 36 having a size and shape substantially equivalent to the size and shape of frame 35. Perimeter D is substantially rectangular in the preferred embodiment. However, it should be appreciated that perimeter D could assume many shapes or be curved. Shelf 34 comprises two sets of arcuate trapezoidal sides 34A, 34B, 34C, and 34D. Arcuate trapezoidal sides 34A and 34B are mirror images and arranged above left and right sides 22 and 23, respectively. Arcuate trapezoidal sides 34A and 34B slope downward and inward from perimeter D to frame 35. Arcuate trapezoidal sides 34C and 34D are mirror images and arranged above front and rear sides 20 and 21, respectively, of sink container 10. Arcuate trapezoidal sides 34C and 34D slope downward and inward from perimeter D to frame 35. As will be described, arcuate trapezoidal sides 34A and 34B are arranged at a larger angle than arcuate trapezoidal sides 34C and 34D.

Arcuate trapezoidal sides 34C and 34D, as shown in FIG. 3B, slope downward at angle β relative to center line X and tangential line X2. Arcuate trapezoidal sides 49C and 49D are the underneath sides of arcuate trapezoidal sides 34C and 34D, respectively. Arcuate trapezoidal sides 34A and 34B, as shown in FIG. 3C, slope downward at angle α relative to center line X and tangential line X1. Arcuate trapezoidal sides 49A and 49B are the underneath sides of arcuate trapezoidal sides 34A and 34B, respectively. Frame 35 is arranged to nest within perimeter 16 of sink container 10 proximate top 15. Frame 35 is preferably shaped substantially similar to perimeter 16 and continuous side wall 19. Preferably, frame 35 fits within sink container 10 because frame 35 is smaller than perimeter 16 and continuous wall 19. Shoulder 37 is located between shelf 34 and frame 35. Shoulder 37 protrudes outwardly from cavity 40 to provide an abutment surface for perimeter 16 when attachment 33 is received with sink container 10.

Figure 4:
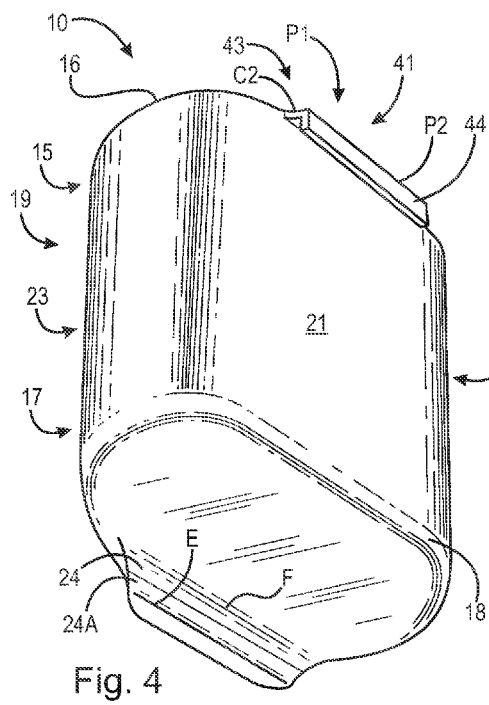
FIG. 4 is a rear perspective view of the sink container of the invention.
Figure 4A:
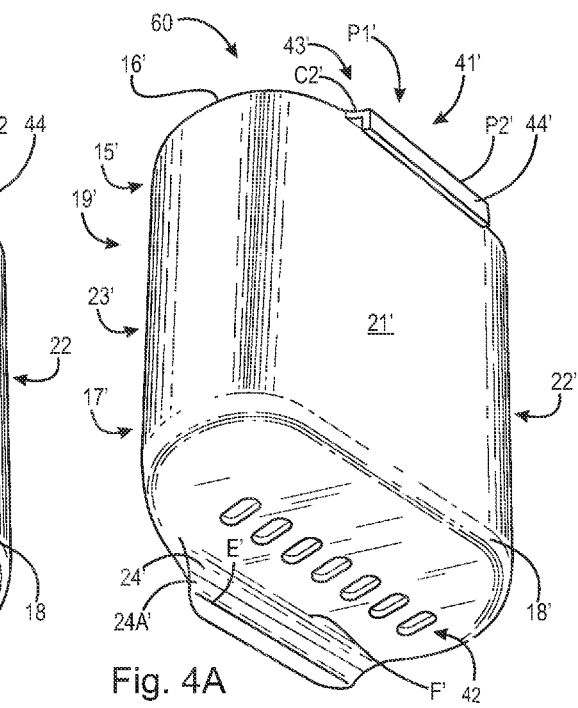
FIG. 4A is a rear perspective view of the caddy of the invention.

FIG. 4 shows a rear perspective of sink container 10. Hanger 41 is shown protruding from perimeter 16 of sink container 10 proximate top 15 and rear 21. Hanger 41 is arranged to removably engage with receiving member 32 (not shown). Additionally, the rear side of foot 24 curves between edge E and edge F (also shown in FIGS. 8, 8A, and 12). FIG. 4A shows caddy 60 of the present invention. Caddy 60 is substantially similar to sink container 10. For clarity, the reference numbers employed in describing caddy 60 which mimic those features of sink container 10 are in prime. Caddy 60 comprises front 20', rear 21', top 15', bottom 17', left side 22', and right side 23'. Front 20', rear 21', right and left sides 22' and 23', respectively, form continuous side wall 19'. Like sink container 10, caddy 60 is generally in the shape of a three dimensional parabola or an open-ended and hollow ellipsoid which is truncated proximate top 15'. Top 15' is defined by perimeter 16', which assumes a shape of an elongated circle having a pair of parallel sides proximate front 20' and rear 21', respectively. Bottom 17' is similarly defined by perimeter 18'. Preferably, perimeter 16' is larger than perimeter 18' and, in turn, top 15' is larger than bottom 17'. Caddy 60 further comprises plurality of apertures 42 arranged in bottom 17' so that caddy 60 can be used as a colander/strainer for rinsing foods or as a receptacle for collecting waste. It should be appreciated that plurality of apertures 42 could be arranged in any suitable manner so that caddy 60 can be used as a colander/strainer or a receptacle. For example, plurality of apertures 42 could be arranged within continuous side wall 19'. Caddy 60 also comprises hanger 41' having protruding segment 43' and hanging segment 44'. Caddy 60 is nestable with sink container 10 so that caddy 60 and sink container 10 can be efficiently packaged. Caddy 60 is made of the same materials as sink container 10 and in substantially the same way. Caddy 60 is arranged to engage and disengage with receiving member 32 in the same way as sink container 10.

Figure 4B:
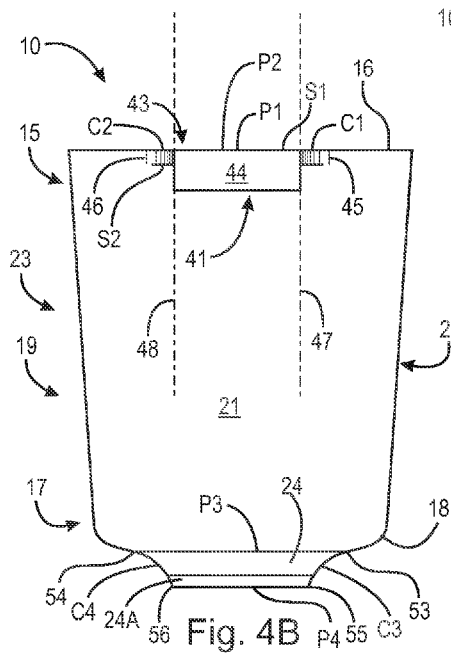
FIG. 4B is a rear view of the sink container of the invention.

Adverting now to FIG. 4B, hanger 41 of sink container 10 comprises protruding segment 43 fixedly secured to hanging segment 44. Protruding segment 43 protrudes from perimeter 16 within the same plane as perimeter 16. Protruding segment 43 is substantially perpendicular to rear 21 and flush with perimeter 16. Protruding segment 43 comprises parallel sides P1 and P2, curved sides C1 and C2, and top and bottom sides S1 and S2. Top and bottom sides S1 and S2 of protruding segment 43 are planar and parallel; top side S1 is upward-facing and bottom side S2 is downward-facing. Parallel sides P1 and P2 are also planar and parallel to edge B shown in FIG. 3. Parallel side P1 comprises protruding points 45 and 46, which are the points from which protruding segment 43 protrude from perimeter 16. Parallel side P2 comprises meeting axes 47 and 48, which indicate where parallel side P2 intersects curved sides C1 and C2 and hanging segment 44. Protruding points 45 and 46 are closer to right and left sides 22 and 23, respectively, as compared with meeting axes 47 and 48 because curved sides C1 and C2 curve inwardly toward hanging segment 44; parallel side P1 is longer than parallel side P2. Curved side C1 connects protruding point 45 to meeting axis 47. Curved side C2 connects protruding point 46 to meeting axis 48. Curved sides C1 and C2 are mirror images.

Hanging segment 44 of hanger 41 is a rectangular prism and perpendicular to perimeter 16. The length of hanging segment 44 is equal to the distance between meeting axes 47 and 48. Protruding segment 43 and hanging segment 44 are substantially "L" shaped except the "L" is oriented 180 degrees such that the upright portion of the "L" faces downward.

Similarly, foot 24 comprises parallel sides P3 and P4, curved sides C3 and C4, protruding points 53 and 54, and end points 55 and 56 (also shown in FIGS. 6 and 6A). The distance between protruding points 53 and 54 is longer than the distance between end points 55 and 56. Curved side C3 connects protruding point 53 to end point 55 and curved side C4 connects protruding point 54 to end point 56. Curved sides C3 and C4 are mirror images.

Figure 4C:
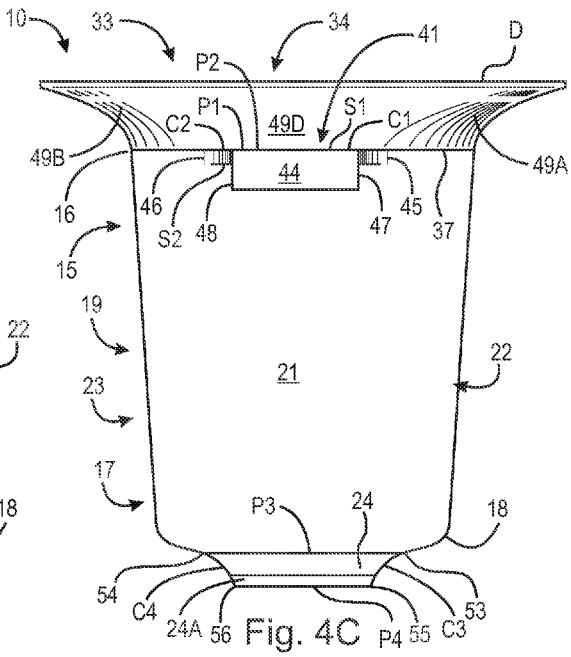
FIG. 4C is a rear view of the sink container and attachment of the invention.

FIG. 4C depicts attachment 33 received within sink container 10. Perimeter 16 abuts shoulder 37 of attachment 33 such that there is no gap. It should be appreciated that in an alternate embodiment, attachment 33 could have no shoulder 37 and perimeter 16 would abut undersides 49A, 49B, 49C, and 49D, which correspond with 34A, 34B, 34C, and 34D discussed above. Frame 35 is obscured by top 15 and continuous side wall 19 because container 10 is preferably opaque. However, as mentioned above, if container 10 was transparent, frame 35 would be visible through top 15 and continuous side wall 19 in cavity 40. Perimeter D is arranged substantially horizontal. Attachment 33 is removable from sink container 10 by a user lifting perimeter D.

It should be appreciated that frame 35 could be arranged to fit outside perimeter 16 proximate top 15. In that case, attachment 33 would include, for example, a shoulder arranged between shelf 34 and frame 35 would protrude inwardly into cavity 40 to provide an abutment to perimeter 16 when attachment 33 and sink container 10 are in received position. In this arrangement, frame 35 would not be disposed within cavity 40 when attachment 33 and sink container 10 are in received position. Instead, frame 35 would be outside sink container 10 surrounding perimeter 16 and continuous side wall 19. Alternatively, frame 35 could include a grooved member substantially shaped as an upside-down "U" having a first part which would protrude downwardly into cavity 40 and a second part which would protrude downwardly along continuous side wall 19. Attachment 33 could be arranged to engage sink container 10 in any suitable manner.

Figures 5, 5A:
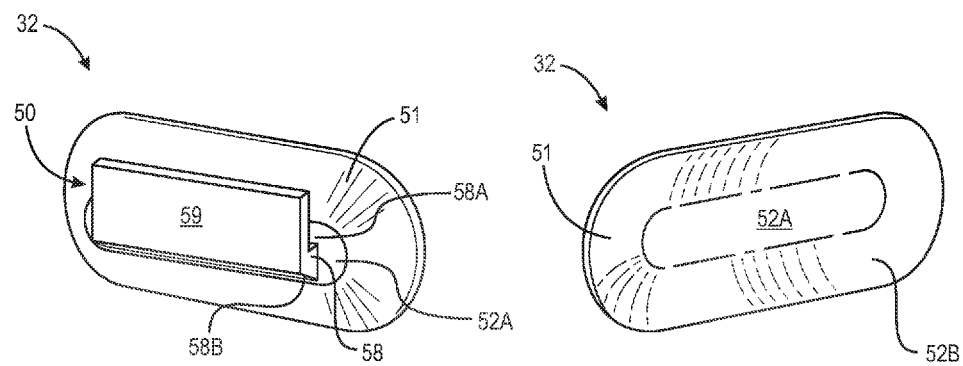
FIG. 5 is a front perspective view of the receiving member of the invention.
FIG. 5A is a rear perspective view of the receiving member of the invention.

A front perspective of receiving member 32 is shown in FIG. 5. Receiving member 32 comprises substantially "L" shaped member 50 fixedly secured to attachment means 51. Substantially "L" shaped member 50 comprises protruding element 58 and upright element 59. Substantially "L" shaped member 50 of receiving member 32 is correspondingly shaped to receive hanger 41. Protruding element 58 is generally a trapezoidal cuboid and upright element 59 is a solid cuboid. Protruding element 58 is an irregular cuboid in that downward facing side 58B is not parallel with upward facing side 58A. Downward facing side 58B slopes downward from the bottom of upright element 59 to center 52A. In use, sink container 10 can be filled with food, water or implements or a user can press down on sink container 10 inadvertently. Downward facing side 58B provides added support for receiving member 32 to maintain engagement with sink container 10. Preferably, attachment means 51 is a suction bar made of a single-piece of molded flexible or elastic material that can easily change shape and create a seal when applied to a nonporous object. Such material also allows receiving member 32 to dislodge from hanger 41' of caddy 60 and/or hanger 41 of sink container 10 if excessive force is applied. Suitable materials for attachment means 51 include, but are not limited to, rubber, silicone, nitrile, vinyl and urethane. In the preferred embodiment, attachment means 51 is a suction bar secured to substantially "L shaped member 50 which can be custom made for example, at Dart Vacuum Ltd. located at Carpenters Court 4a Lewes Road, Bromley, Kent BR1 2RN UK. It should be appreciated that attachment means 51 could also comprise at least one suction cup.

A rear perspective of receiving member 32 is shown in FIG. 5A. Attachment means 51 comprises center 52A, which is planar and cupped portion 52B which curves outwardly from center 52A and substantially "L" shaped member 50. Attachment means 51 is arranged to be suctioned to a solid surface.

Figures 5B, 5C:
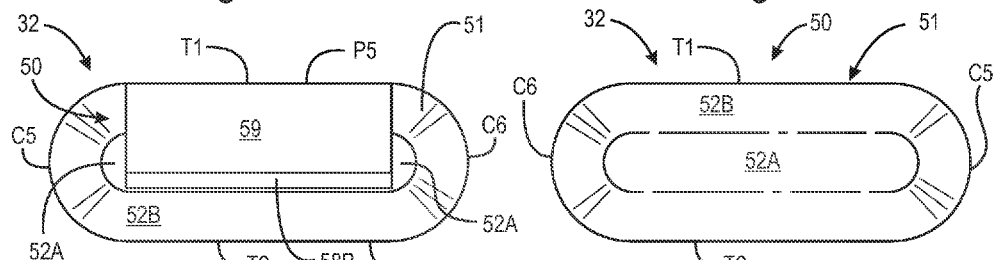
FIG. 5B is a front view of the receiving member of the invention.
FIG. 5C is a rear view of the receiving member of the invention.

FIG. 5B shows a front view of receiving member 32. Attachment means 51 comprises parallel sides P5 and P6, curved sides C5 and C6, upper-most point T1, and lower-most point T2. Upright element 59 of substantially "L" shaped member 50 has a height, which is approximately equal to half the distance between upper-most and lower-most points T1 and T2. Center 52A is arranged between cupped portion 52B and upright element 59. Downward facing side 58B slopes from the bottom edge of upright element 59 to center 52A.

A rear view of receiving member 32 is shown in FIG. 5C where substantially "L" shaped member 50 is fully obstructed by attachment means 51 because attachment means 51 is preferably opaque. Center 52A is located approximately in the center of cupped portion 52B.

Figures 5D, 5E:
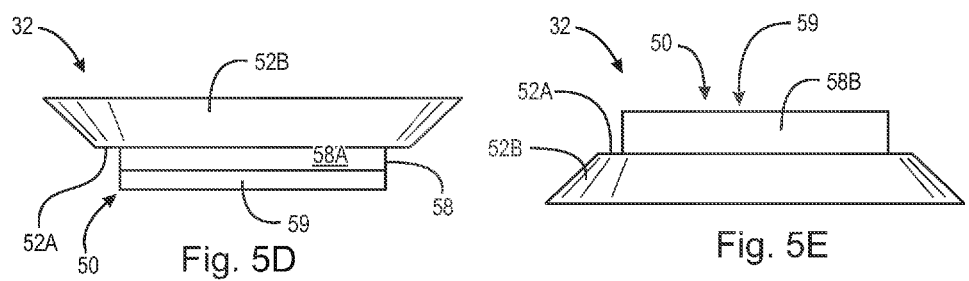
FIG. 5D is a top view of the receiving member of the invention.
FIG. 5E is a bottom view of the receiving member of the invention.

FIGS. 5D and 5E show a top and bottom view of receiving member 32, respectively. FIG. 5D shows cupped portion 52B, which is trapezoidal. Center 52A is planar. Protruding element 58 protrudes downwardly from center 52A perpendicular to center 52A. Upright element 59 is perpendicular to protruding element 58 and parallel with center 52A. FIG. 5E shows a bottom view of cupped portion 52B which is the mirror image of cupped portion 52B shown in FIG. 5D. Upright element 59 is not visible behind protruding element 58, which is preferably opaque.

Figures 5F, 5G:
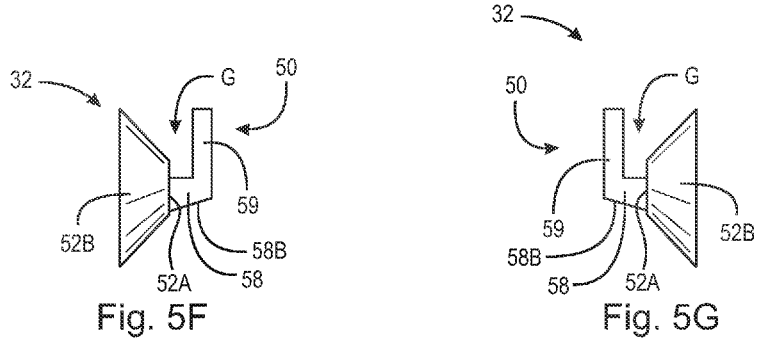
FIG. 5F is a left side view of the receiving member of the invention.
FIG. 5G is a right side view of the receiving member of the invention.

FIGS. 5F and 5G show a left and right view of receiving member 32, respectively. Hanging segment 44 (not shown) is arranged to engage receiving member 32 in groove G that is located between upright element 59, center 52A and cupped portion 52B. Cupped portion 52B shown in FIG. 5G is the mirror image of the cupped portion 52B shown in FIG. 5F. Similarly, "L" shaped member 50 shown in FIG. 5G is the mirror image of "L" shaped member 50 shown in FIG. 5F.

Sink container 10 is engaged with receiving member 32 in FIG. 6. Receiving member 32 is not visible above or from the front of sink container 10 due to the opacity of sink container 10. Receiving member 32 is arranged opposite front 20 and foot 24. FIG. 6A shows, the rear view of sink container 10 engaged with receiving member 32. Receiving member 32 is arranged below perimeter 16 and parallel sides P1 and P2. When receiving member 32 is suctioned to a wall of a sink, cupped portion 52B flattens against the wall of a sink; the distance between upper-most point T1 and lower-most point T2 increases. Upper-most point T1 is pressed toward parallel sides P1 and P2 and lower-most point T2 is pressed in the general direction of bottom 17 and foot 24. Curved sides C5 and C6 spread toward right and left sides 23, 22, respectively when cupped portion 52B is suctioned.

FIG. 7 shows a detail of sink container 10 engaged with receiving member 32 proximate to but, not suctioned to inner wall 12 of sink 11. The distance between T1 and T2 is unchanged from that shown in FIG. 6A. Parallel sides P1 and P2 of protruding segment 43 are shown. The distance between parallel sides P1 and P2 is sufficient to rest atop upright element 59. The heights of upright element 59 and hanging segment 44 are substantially similar. FIG. 7A shows right side 23 of sink container 10 with receiving member 32 before suctioning. The slope of downward facing side 58B of protruding element 58 is shown in both FIGS. 7 and 7A.

Sink container 10 and receiving member 32 are shown suctioned to inner wall 12 of sink 11 in FIGS. 8 and 8A. Cupped portion 52B has flattened by the suctioning. Upper-most and lower-most points T1 and T2 are further apart in FIGS. 8 and 8A than they are in FIGS. 7 and 7A. Parallel side P2 is proximate inner wall 12 of sink 11. FIG. 8A shows a partial cross section of sink container 10 shown in FIG. 3C taken along line 8A-8A. Brush 70 of the invention is shown nested within sink container 10. Brush 70 could be any suitable brush. Brush 70 allows a user of the invention to wash potatoes or remove grime and food particles during dishwashing, for example. Preferably, brush 70 nests within sink container 10 and caddy 60 for efficient product packaging.

Figure 9:
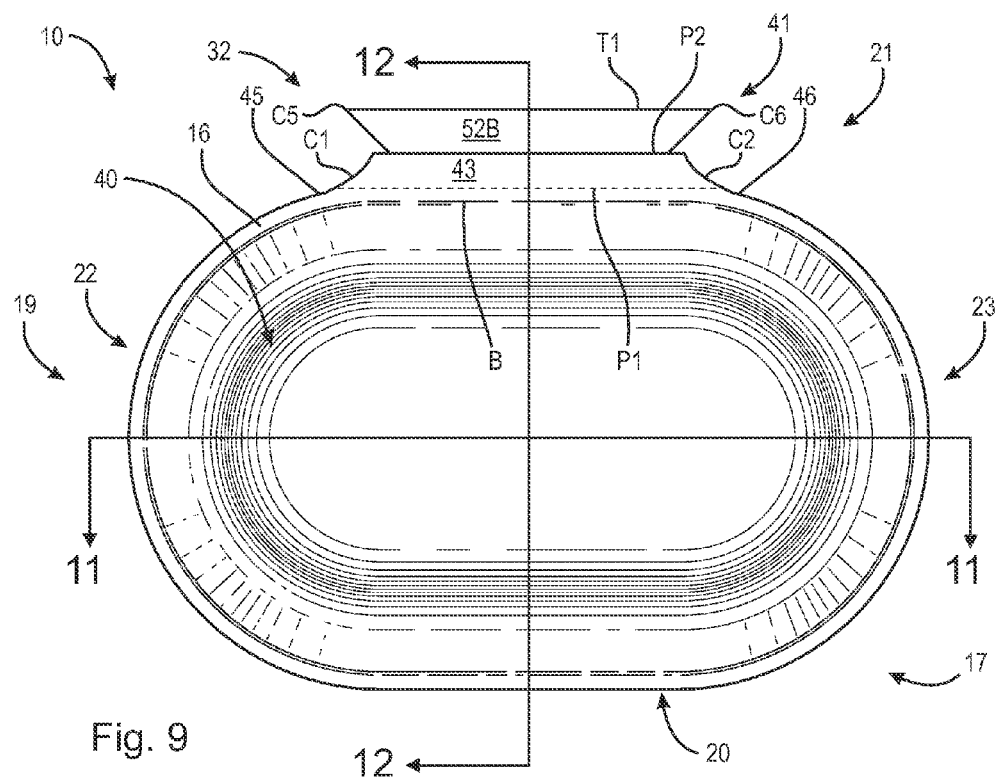
FIG. 9 is a top plan view of the sink container and receiving member of the invention.

FIG. 9 shows a top view of sink container 10 engaged with receiving member 32. The preferred shape of perimeter 16 is shown. It should be appreciated that cavity 40 narrows downwardly along continuous side wall 19 in the direction of bottom 17. The longer length of parallel side P1 in comparison to the length of parallel side P2 is shown. Hanging segment 44 and upright element 59 are not visible under protruding segment 43. The base of sink container 10 is flat and parallel with perimeter 16 and protruding segment 43.

Figure 10:
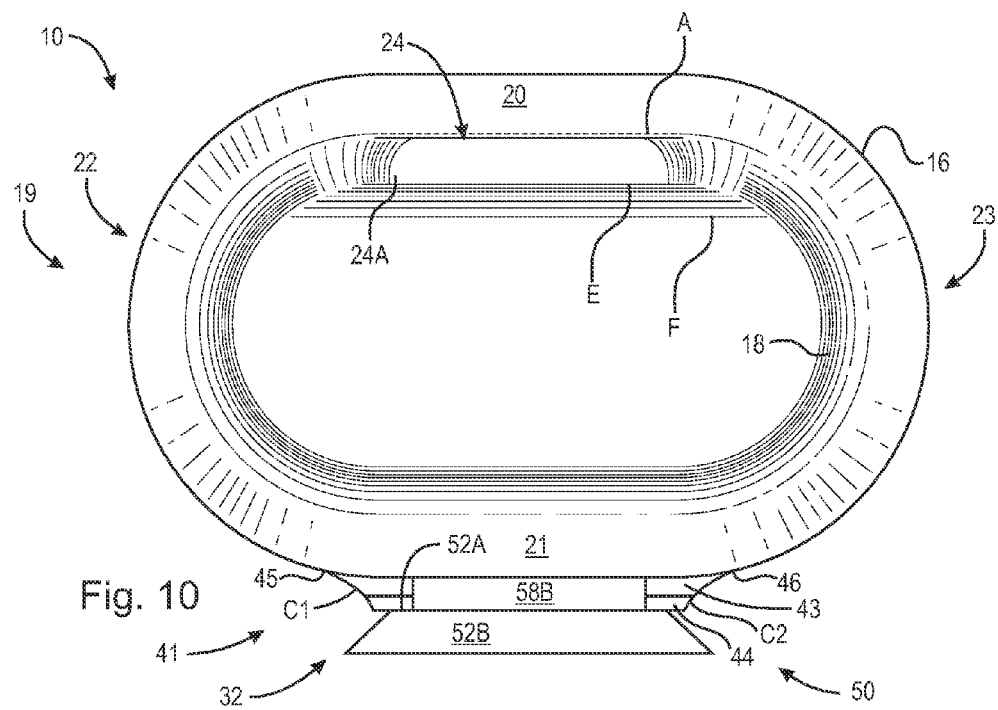
FIG. 10 is a bottom plan view of the sink container and receiving member of the invention.

A bottom view of sink container 10 engaged with receiving member 32 is shown in FIG. 10. The taper of continuous side wall 19 is consistent along perimeters 16 and 18. The curve of the rear of foot 24 is shown from edge E to edge F. Edge A is shown opposite edge E. Edge A is proximate the front and top of foot 24 whereas edge E is proximate the bottom and rear of foot 24. Rubber 24A of foot 24 is shown covering the entire length of foot 24. However, it should be appreciated that rubber 24A could be intermittent or arranged in any suitable manner to provide slip resistance for example, protrusions. Protruding points 45 and 46 are shown where curved sides C1 and C2 start leading away from perimeter 16. The length of protruding element 58 is substantially similar to the length of center 52A of receiving member 32. Similarly, the length of hanging segment 44 of substantially "L" shaped member 50 is substantially similar to the lengths of center 52A and protruding element 58; thus, hanging segment 44 is not visible in this Figure.

Figure 11:
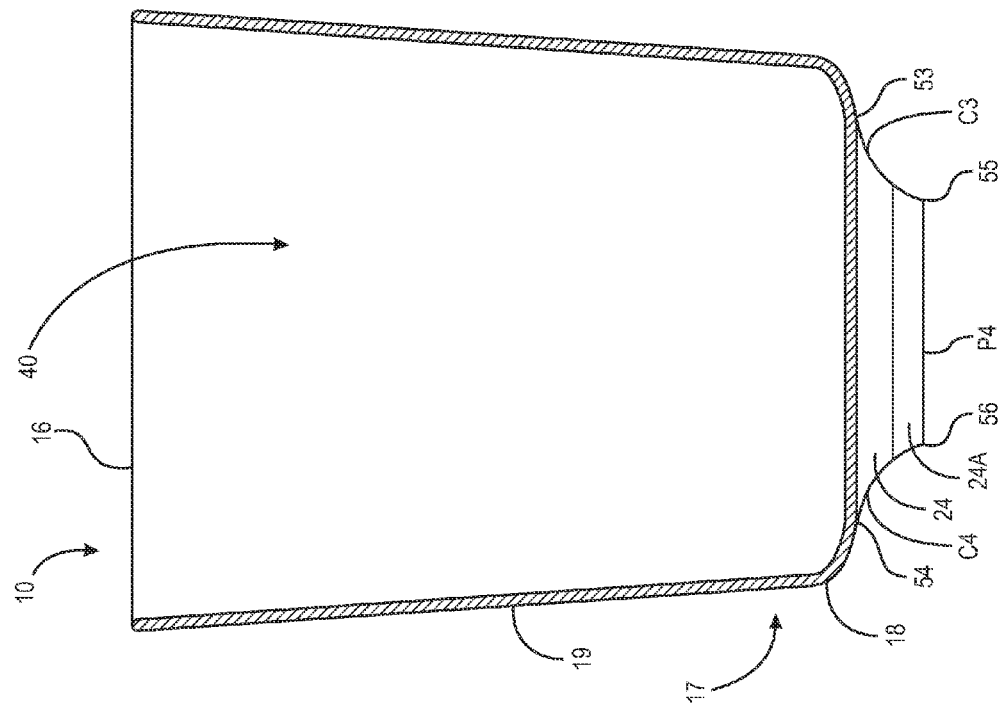
FIG. 11 is a cross section view of the sink container and receiving member of the invention taken along 11-11 in FIG. 9.

FIG. 11 is a cross-sectional view of sink container 10 taken generally along line 11-11 in FIG. 9 showing the plane of perimeter 16, the taper of continuous side wall 19, cavity 40 and foot 24. Continuous side wall 19 is solid however, it could be hollow.

Figure 12:
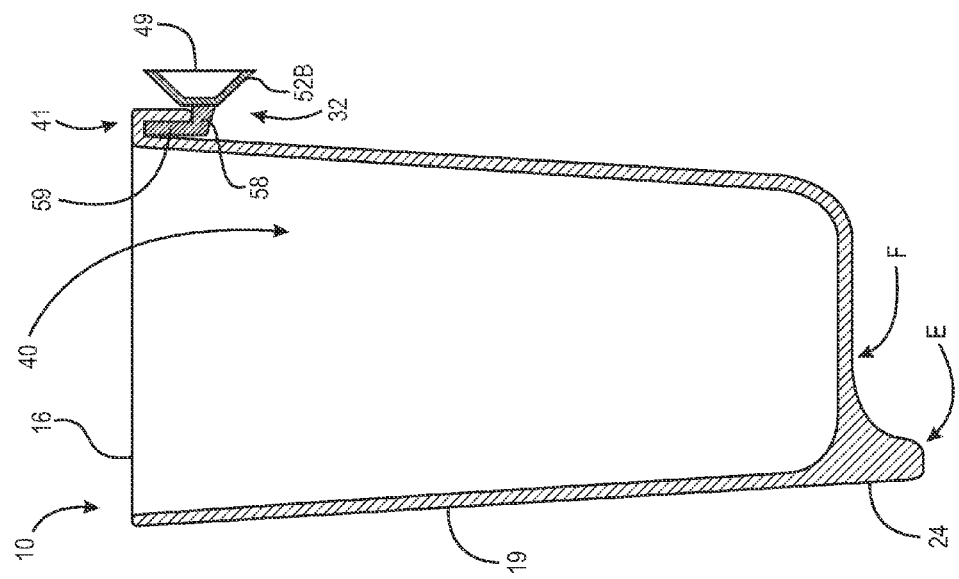
FIG. 12 is a cross section view of the sink container and receiving member of the invention taken along 12-12 in FIG. 9.

FIG. 12 is a cross-sectional view of sink container 10 and receiving member 32 taken generally along line 12-12 in FIG.

9 showing cavity 40, hanger 41, and foot 24. Continuous side wall 19 as well as foot 24 are solid in comparison to cavity 40. Cupped portion 52B of attachment means 51 has void 49 in comparison to protruding element 58 and upright element 59 which are solid. Void 49 allows cupped portion 52B to flatten and suction when attachment means 51 is pressed to a nonporous surface. The curve of the rear of foot 24 is shown between edges E and F.

Figure 13:
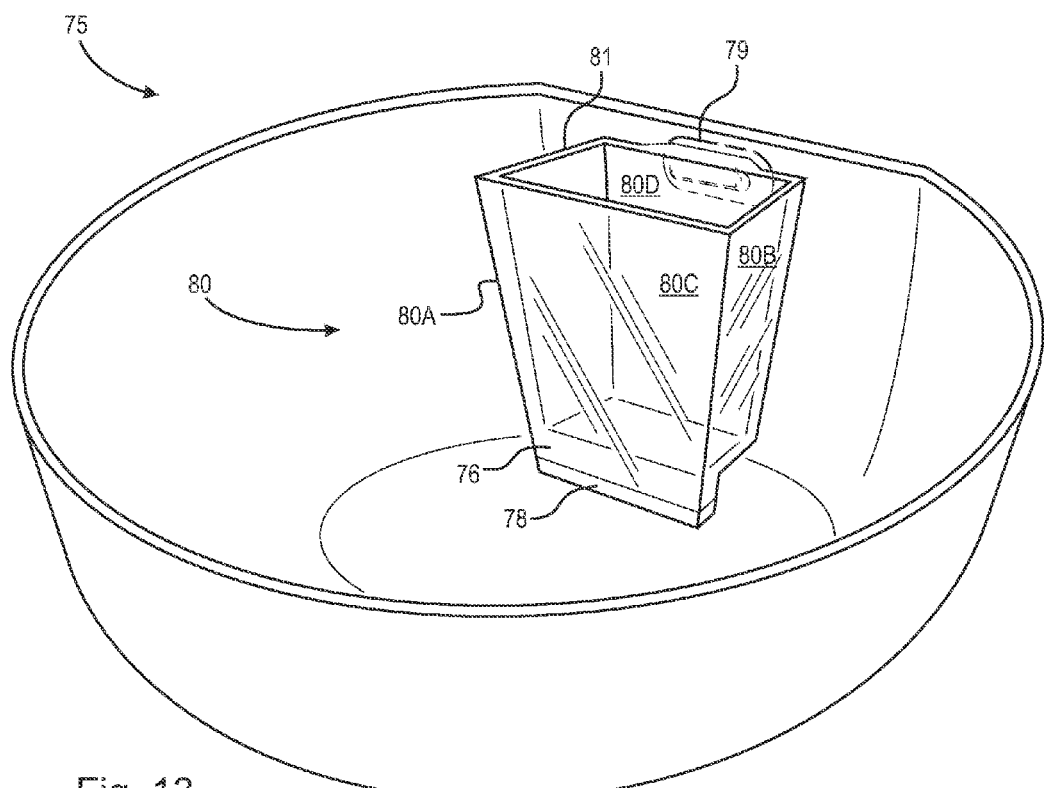
FIG. 13 is an alternate embodiment of the invention.

An alternative embodiment 75 of the present invention is shown in FIG. 13. Continuous side wall 80 is transparent and comprises side walls 80A, 80B, 80C, and 80D. Side walls 80A and 80B are opposite and side walls 80C and 80D are opposite. Side wall 80A is secured to the left-most sides of side walls 80C and 80D. Side wall 80B is secured to the right-most sides of side walls 80C and 80D. Side walls 80C and 80D are parallel and opposite. Side wall 80C connects side walls 80A and 80B proximate foot 76. Side wall 80D connects side walls 80A and 80B proximate hanger 79. Continuous side wall 80 is nonporous. It should be appreciated that alternative embodiment 75 could also be perforated like caddy 60. Foot 76 protrudes downwardly from continuous side wall 80C and partially from side walls 80A and 80B. Hanger 79 protrudes outwardly from perimeter 81 proximate side wall 80D.

Figure 14:
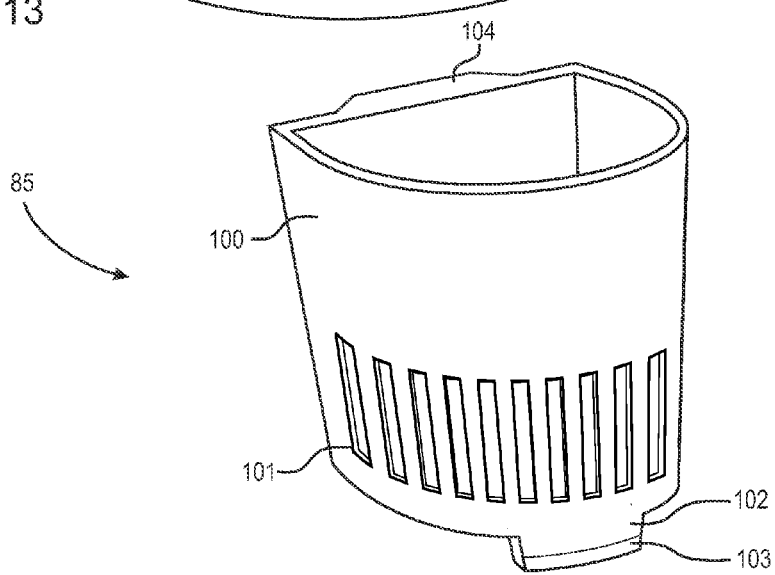
FIG. 14 is an alternate embodiment of the invention.

Another embodiment 85 of the present invention is shown in FIG. 14. Continuous side wall 100 comprises perforations 101 which are disposed within the height of continuous side wall 100. Continuous side wall 100 is D-shaped. Foot 102 and rubber 103 protrude downwardly from continuous side wall 100 opposite hanger 104.

Sink organizer 10 can be formed by extrusion, molding, etc., or any suitable method of forming the solid structure described herein preferably, thermoplastic resin molding. Sink organizer 10 can be made of metal (e.g., steel, aluminum, alloys, etc.), synthetic material (e.g., silicone, rubber, plastics, polymeric materials) or natural material (e.g., wood, bamboo, etc.), and may be finished by any suitable means (e.g., painted, coated, smoothed, polished, brushed, textured, etc.). Preferably, sink organizer 10 is made of a dishwasher safe, antibacterial, and recyclable material.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS 10 sink container
11 sink
12 inner wall
13 sponge
14 toothpaste tube
15 top
15' top
16 perimeter
16' perimeter
17 bottom
17' bottom
18 perimeter
18' perimeter
19 continuous side wall
19' continuous side wall
20 front
20' front
21 rear
21' rear
22 left side
22' left side
23 right side
23' right side
24 foot
24A rubber
A edge
B edge
25 bottom surface of sink
26 free flowing water
27 top surface
28 faucet
29 drainage hole
30 countertop
32 receiving member
33 attachment
34 shelf
34A first arcuate trapezoidal side
34B second arcuate trapezoidal side
34C third arcuate trapezoidal side
34D fourth arcuate trapezoidal side
α angle
β angle
35 frame
36 at least one opening
37 shoulder
D perimeter
40 cavity
41 hanger
42 plurality of apertures
43 protruding segment
44 hanging segment
45 protruding point
46 protruding point
47 meeting axis
48 meeting axis
49 void
P1 parallel side
P2 parallel side
P3 parallel side
P4 parallel side
P5 parallel side
P6 parallel side
S1 top side
S2 bottom side
C1 curve 1
C2 curve 2
C3 curve 3
C4 curve 4
49A underside
49B underside
49C underside
49D underside
X center line
X1 tangential line 1
X2 tangential line 2
50 "L" shaped member
51 suction
52A center
52B cupped portion
53 protruding point
54 protruding point 55 end point
56 end point
58 protruding element
59 upright element
T1 upper-most point
T2 lower-most point
G groove
60 caddy
70 brush
75 embodiment
76 foot
78 rubber
79 hanger
80 continuous side wall
80A side
80B side
80C side
80D side
81 perimeter
85 embodiment
100 continuous side wall
101 perforations
102 foot
103 rubber
104 hanger

What is claimed is:

1. A sink container assembly, comprising:
a container having a longitudinal center line and a top surface;
a hanger protruding outwardly from the top surface such that a line, orthogonal to the longitudinal center line, passes along the top surface and the hanger, the hanger including a hanging segment;
a foot protruding downwardly from the container; and,
a receiving member arranged to receive the hanger and removably secure the container to a substantially vertical surface;
wherein when the receiving member is secured to the substantially vertical surface, the top surface is substantially orthogonal to the longitudinal center line.

2. The sink container assembly recited in claim 1, wherein the hanger and the foot are positioned on opposite sides of the longitudinal center line.

3. The sink container assembly recited in claim 1, wherein the hanging segment is arranged to be substantially flush with the vertical surface.

4. The sink container assembly recited in claim 1, wherein the hanger includes two members arranged at a substantially right angle.

5. The sink container assembly recited in claim 4, wherein the receiving member includes two members arranged at a substantially right angle arranged substantially 180 degrees relative to the two members of the hanger.

6. The sink container assembly recited in claim 1, wherein the sink container assembly includes only a single foot.

7. The sink container assembly recited in claim 1, wherein the receiving member includes a suction cup.

8. The sink container assembly recited in claim 7, wherein the suction cup is wider than it is tall.

9. The sink container assembly recited in claim 8, wherein the suction cup has a cross-section that is substantially trapezoidal.

10. The sink container assembly recited in claim 1, further comprising an attachment which is removably engageable with the container, the attachment comprising:
a frame; and,
a shelf arranged atop the frame where the shelf comprises:
a first side sloping downward to the frame at a first angle relative to the longitudinal center line; and,
a second side sloping downward to the frame at a second angle relative to the longitudinal center line, where the second angle is different from the first angle.

11. The sink container assembly recited in claim 10, wherein the first side is adjacent to the second side.

12. The sink container assembly recited in claim 1, wherein the container includes at least one perforation proximate the foot for drainage.

13. A sink container assembly, comprising:
a container having a longitudinal center line and a top surface;
a hanger protruding outwardly from the top surface such that a line, orthogonal to the longitudinal center line, passes through the top surface and a top of the hanger, the hanger including a hanging segment;
a foot protruding downwardly from the container; and,
a receiving member arranged to receive the hanger and removably secure the container to a substantially vertical surface;
wherein when the sink container assembly is secured to the substantially vertical surface, the top surface is substantially orthogonal to the longitudinal center line and the hanger and the foot are positioned on opposite sides of the longitudinal center line.

14. The sink container assembly recited in claim 13, wherein the hanging segment extends substantially perpendicular to the top surface.

15. The sink container assembly recited in claim 13, wherein the hanging segment is arranged to be at least partially flush with the vertical surface.

16. The sink container assembly recited in claim 13, wherein the hanger includes two members arranged at a substantially right angle.

17. The sink container assembly recited in claim 16, wherein the receiving member includes two members arranged at a substantially right angle arranged substantially 180 degrees relative to the two members of the hanger.

18. The sink container assembly recited in claim 13, wherein the receiving member includes a suction cup.

19. The sink container assembly recited in claim 18, wherein the suction cup is wider than it is tall and the suction cup has a cross-section that is substantially trapezoidal.

20. The sink container assembly recited in claim 13, further comprising an attachment which is removably engageable with the container, the attachment comprising:
a frame; and,
a shelf arranged atop the frame where the shelf comprises:
a first side sloping downward to the frame at a first angle relative to the longitudinal center line; and,
a second side sloping downward to the frame at a second angle relative to the longitudinal center line, the second angle different from the first angle.

21. The sink container assembly recited in claim 20, wherein the first side is adjacent to the second side.

* * * * *